(12) United States Patent
Dobkin et al.

(10) Patent No.: US 8,707,229 B1
(45) Date of Patent: Apr. 22, 2014

(54) STATIC ANALYSIS OF VLSI RELIABILITY

(75) Inventors: Rostislav (Reuven) Dobkin, Yokneam Illit (IL); Leonid Brook, Haifa (IL)

(73) Assignee: VSYNC Circuit, Ltd., Yokneam Illit (IL)

( * ) Notice: Subject to any disclaimer, the term of this patent is extended or adjusted under 35 U.S.C. 154(b) by 91 days.

(21) Appl. No.: 13/191,487

(22) Filed: Jul. 27, 2011

Related U.S. Application Data

(60) Provisional application No. 61/368,276, filed on Jul. 28, 2010.

(51) Int. Cl.
*G06F 17/50* (2006.01)

(52) U.S. Cl.
USPC .......................................................... 716/106

(58) Field of Classification Search
USPC .......................................................... 716/106
See application file for complete search history.

(56) References Cited

U.S. PATENT DOCUMENTS

| | | | |
|---|---|---|---|
| 5,870,308 A | 2/1999 | Dangelo et al. | |
| 6,169,968 B1 | 1/2001 | Kabuo | |
| 6,836,877 B1 | 12/2004 | Dupenloup | |
| 7,248,661 B1 | 7/2007 | Almog et al. | |
| 7,328,421 B1 | 2/2008 | Ballagh et al. | |
| 7,779,286 B1 | 8/2010 | Pritchard et al. | |
| 7,779,322 B1 | 8/2010 | Wang et al. | |
| 7,870,528 B2 | 1/2011 | Ja et al. | |
| 7,908,574 B2 | 3/2011 | Larouche et al. | |
| 7,962,886 B1 | 6/2011 | Pandey et al. | |
| 7,984,404 B2 | 7/2011 | Do et al. | |
| 8,117,577 B1 | 2/2012 | Vadi et al. | |
| 8,271,918 B2 | 9/2012 | Kwok et al. | |
| 8,418,092 B2 | 4/2013 | Basto et al. | |
| 8,448,111 B2 | 5/2013 | Mneimneh et al. | |
| 2003/0192023 A1* | 10/2003 | Murphy | 716/11 |
| 2004/0221249 A1 | 11/2004 | Lahner et al. | |
| 2004/0225974 A1 | 11/2004 | Johnson | |
| 2005/0097484 A1* | 5/2005 | Sarwary et al. | 716/6 |
| 2005/0268258 A1 | 12/2005 | Decker | |
| 2005/0273735 A1 | 12/2005 | Dargelas | |
| 2006/0190754 A1 | 8/2006 | Dargelas et al. | |
| 2006/0282808 A1 | 12/2006 | Byrn et al. | |
| 2007/0271538 A1* | 11/2007 | Douady et al. | 716/6 |
| 2008/0008021 A1 | 1/2008 | Sarwary et al. | |
| 2008/0301601 A1 | 12/2008 | Ng et al. | |
| 2008/0313578 A1 | 12/2008 | Maixner et al. | |
| 2008/0313579 A1 | 12/2008 | Larouche et al. | |
| 2009/0235222 A1 | 9/2009 | Raje et al. | |
| 2010/0180240 A1 | 7/2010 | Davis et al. | |

(Continued)

OTHER PUBLICATIONS

Dey et al., "Time for a Change: Making Clock-Domain-Crossing Analysis Usable and Useful", Chip Design Magazine, Oct./Nov. 2010.*

(Continued)

*Primary Examiner* — Jack Chiang
*Assistant Examiner* — Brandon Bowers
(74) *Attorney, Agent, or Firm* — D. Kligler IP Services Ltd.

(57) ABSTRACT

A circuit verifier having an input interface configured to receive descriptions of integrated circuits and a processing unit configured to scan through a description of an integrated circuit received through the input interface in order to identify clock domain crossings in the circuit and to provide a numerical score for each of the identified clock domain crossings.

34 Claims, 3 Drawing Sheets

(56) References Cited

U.S. PATENT DOCUMENTS

2010/0306725 A1 12/2010 Kawasaki
2010/0315134 A1 12/2010 Murari
2010/0322365 A1 12/2010 Dobkin et al.

OTHER PUBLICATIONS

"Understanding Metastability in FPGAs", Jul. 2009, http://www.altera.com/literature/wp/wp-01082-quartus-ii-metastability.pdf.*
"Managing Metastability with the Quartus II Software", Jun. 2012, http://www.altera.com/literature/hb/qts/qts_qii51018.pdf.*
U.S. Appl. No. 13/557,215, filed Jul. 25, 2012.
U.S. Appl. No. 13/337,170, filed Dec. 26, 2011.
Yeager et al., "Congestion Estimation and Localization in FPGAs: A Visual Tool for Interconnect Prediction", 9th International Workshop on System-Level Interconnect Prediction (SLIP'07), Austin, USA, Mar. 17-18, 2007.
Chen et al., "A Comprehensive Approach to Modeling, Characterizing and Optimizing for Metastability in FPGAs", Proceedings of the ACM/SIGDA 18th International Symposium on Field Programmable Gate Arrays, pp. 167-176, Monterey, USA, Feb. 21-23, 2010.
Altera Corporation, "Quartus II Handbook", vol. 1, chapter 11, year 2004.
Beer et al., "The Devolution of Synchronizers", Proceedings of the the 16th IEEE International Symposium on Asynchronous Circuits and Systems (ASYNC), pp. 94-103, Grenoble, France, May 3-6, 2010.
Dike et al., "Miller and Noise Effects in a Synchronizing Flip-Flop", IEEE Journal of Solid-State Circuits, vol. 34, No. 06, pp. 849-855, Jun. 1999.
Alfke, P., "Metastable Delay in Virtex FPGAs", Xilinx Inc Forum, Mar. 28, 2008 http://forums.xilinx.com/t5/PLD-Blog/Metastable-Delay-in-Virtex-FPGAs/ba-p/7996.
Semiat et al., "Timing Measurements of Synchronization Circuits", Proceedings of the 9th International Symposium on Asynchronous Circuits and Systems (ASYNC'03), Vancouver, Canada, May 12-15, 2003.
VSYNC Circuits Ltd Brochure, May 28, 2011.
Zhou et al., "On-chip Measurement of Deep Metastability in Synchronizers", IEEE Journal of Solid-State Circuits, vol. 43, No. 2, pp. 550-557, Feb. 2008.
U.S. Appl. No. 61/511,581, filed Jul. 26, 2011.
Ginosar, R., "Fourteen Ways to Fool Your Synchronizer", Proceedings of the 9th International Symposium on Asynchronous Circuits and Systems (ASYNC'03), Vancouver, Canada, May 12-15, 2003.
Dobkin et al., "Fast Universal Synchronizers", International Workshop on Power and Timing Modeling, Optimization and Simulation (PATMOS), pp. 199-208, Lisbon, Portugal, Sep. 10-12, 2008.
U.S. Appl. No. 61/427,182, filed Dec. 26, 2010.
Dally et al., "Digital System Engineering", Cambridge University Press, 1998.
Kleeman et al., "Metastable Behavior in Digital Systems", IEEE Design and Test of Computers, pp. 4-19, Dec. 1987.
Chu et al., "A Design Methodology for Concurrent VLSI Systems", International Conference on Computer Design: VLSI in Computers, pp. 407-410, Port Chester, Oct. 7-10, 1985.
Dobkin, R., "Synchronization Issues in Multiple-Clock Domain Designs", ChipEx 2010, Airport City, Israel, May 4, 2010.
Kapschitz et al., "Formal Verification of Synchronizers", Proceedings of CHARME 2005 Conference, pp. 363-366, Saarbrucken, Germany, Oct. 3-6, 2005.
Brown, G.M., "Verification of a Data Synchronization Circuit for All Time", Proceedings of the Sixth International Conference on Application of Concurrency to System Design (ACSD 2006), pp. 217-228, Turku, Finland, Jun. 28-30, 2006.
Bing et al., "Automatic Formal Verification of Clock Domain Crossing Signals", Proceedings of the 14th Asia and South Pacific Design Automation Conference (ASP-DAC 2009), pp. 654-659, Yokohama, Japan, Jan. 19-22, 2009.
Litterick et al., "Pragmatic Simulation-Based Verification of Clock Domain Crossing Signals and Jitter using SystemVerilog Assertions", Design and Verification Conference and Exhibition (DVCON'06), San Jose, USA, Feb. 22-24, 2006.
Dobkin et al., "Assertion Based Verification of Multiple-Clock GALS Systems", 16th International Conference on Very Large Scale Integration (VLSI-SOC), Rhodes Island, Greece, Oct. 13-15, 2008.
Kayam et al., "Symmetric Boost Synchronizer for Robust Low Voltage, Low Temperature Operation", Technical Report, Technion EE Department, year 2007.
Dobkin et a., "High Rate Data Synchronization in GALS SoCs", IEEE Transactions on VLSI, vol. 14, No. 10, pp. 1063-1074, 2006.
Dobkin et al., "Two Phase Synchronization with Sub-Cycle Latency", VLSI Integration Journal, vol. 42, No. 2, pp. 367-375, year 2009.
Jex et al., "A Fast resolving BiNMOS Synchronizer for Parallel Processor Interconnect", IEEE Journal of Solid-State Circuits, vol. 30, issue 2, pp. 133-139, Feb. 1995.
Aspen Logic Inc, "Managing Synchronizer MTBF", Aspen Logic Journal (v1.0), Feb. 25, 2009.
Synopsys Inc., "IC Compiler: the next-generation physical design system", Datasheet, year 2009.
Synopsys Inc., "DesignWare Intellectual Property: The Most Widely Used, Silicon-Proven IP", Datasheet, year 2010.
Synopsys Inc., "Leda: RTL Checker", year 2010.
Cadence Design Systems Inc., "Encounter Conformal Equivalence Checker", year 2011.
AXIOM Design Automation, "About the company", year 2010 (www.athdl.com).
Real Intent Inc., "Clock Domain Crossing Demystified: The Second Generation Solution for CDC Verification", Whitepaper, Jun. 30, 2008.
Yeung, P., "Five Steps to Quality CDC Verification", Whitepaper, Mentor Graphics Corporation, year 2007.
Atrenta Inc., "SpyGlass CDC", year 2011.
Blue Pearl Software, "INDIGO: RTL Analysis", Sep. 14, 2006.
U.S. Appl. No. 13/557,215 office action dated Sep. 3, 2013.
Chiorboli et al., "ADC modeling and testing", IEEE instrumentation and measurement technology conference, vol. 3, pp. 1992-1999, Hungary, May 21-23, 2001.
U.S. Appl. No. 13/337,170 Office Action dated Jun. 11, 2013.

* cited by examiner

STATIC ANALYSIS OF VLSI RELIABILITY

CROSS-REFERENCE TO RELATED APPLICATION

This application claims the benefit under 35 USC 119(e) of U.S. Provisional Patent Application 61/368,276, filed Jul. 28, 2010, which is incorporated herein by reference.

FIELD OF THE INVENTION

The present invention relates generally to integrated circuits and particularly to design verification of integrated circuits.

BACKGROUND OF THE INVENTION

Integrated circuits have become very complex, sometimes including millions of transistors on a single chip. The processes currently used in production of integrated circuits allow for using very small transistors, which makes their design even more complex. It is therefore important to verify correctness of the design of integrated circuits.

Many elements of integrated circuits are synchronous elements which are timed by a clock signal. The faster the clock signal operates, the more operations are performed by the integrated circuit within a given time. There are, however, limitations on the speed at which circuits can operate and the clock signal therefore has to have a rate lower than the fastest rate allowed by the circuit. Different circuits are therefore designed at different rates. Some integrated circuits include sections which operate at different clock rates. A point at which circuits having different clock rates are interconnected is referred to as a clock domain crossing (CDC). Incorrect design of clock domain crossings may result in the entire integrated circuit not operating properly.

A paper titled: "A Comprehensive Approach to Modeling, Characterizing and Optimizing for Metastability in FPGAs", by Betz et al., the disclosure of which is incorporated herein by reference, presents a function for calculating a mean time between synchronization failures (MTBF) and requires that the MTBF be sufficiently long to avoid synchronization failures.

Chapter 11 of the Quatrus II handbook, Vol. 1, describes a timing analyzer which reports the MTBF for synchronizers included in a designed circuit.

US patent application publication 2005/0097484 to Sarwary et al., the disclosure of which is incorporated herein by reference, describes a computer program which searches integrated circuits for clock crossings and verifies that they have an explicit synchronization cell. If there is no synchronization cell, the computer program determines if the clock is stable at the crossing.

US patent application publication 2006/0190754 to Dargelas et al., the disclosure of which is incorporated herein by reference, describes a tool which automatically detects handshake mechanisms for controlling data transfer over CDCs and verifies their correctness.

SUMMARY

Embodiments of the present invention that are described hereinbelow provide a circuit verifier, comprising an input interface configured to receive descriptions of integrated circuits, a processing unit configured to scan through a description of an integrated circuit received through the input interface in order to identify clock domain crossings in the circuit and to provide a numerical score for each of the identified clock domain crossings.

Optionally, the processing unit is configured to calculate for each clock domain crossing, a mean time between synchronization failures (MTBF). Optionally, the descriptions of integrated circuits comprise descriptions in a hardware definition language. Optionally, the processing unit is configured to provide numerical scores for integrated circuits of different types, including ASIC (Application Specific Integrated circuit), FPGA (Field Programmable Gate Array) and CPLD (Complex Programmable Logic Device).

Optionally, the processing unit is configured to calculate a general score for integrated circuits based on the scores of the clock domain crossings. Optionally, the processing unit is configured to receive timing information from a user through the input interface and to determine the scores responsive to the received timing information. Optionally, the received timing information comprises rates of the clock signals of the circuit. Optionally, the processing unit is configured to compare the identified clock domain crossings to a library of clock domain crossing templates including corresponding timing information and to determine the score using the corresponding time information of a matching template. Optionally, the processing unit is configured to compare at least some of the identified clock domain crossings to a library of erroneous clock domain crossing templates.

Optionally, in identifying clock domain crossings, the processing unit is configured to identify and provide a score for clock domain crossings having a black-box as a source or sink, an external port as a source or sink and/or having a sink in an asynchronous reset pin of a sequential logic element. Optionally, in identifying clock domain crossings, the processing unit is configured to identify and provide a score for clock domain crossings involving a clock signal moving from a first clock domain to a second clock domain. Optionally, the processing unit is configured to assign a single object to a plurality of clock domains concurrently, when appropriate.

There is further provided in accordance with an embodiment of the present invention, a method of analyzing a circuit, comprising receiving, by a processor, a description of a circuit, searching through the circuit for clock domain crossings, automatically by the processor; classifying the clock domain crossings found in the search; and assigning a score to each of the clock domain crossings.

Optionally, searching for clock domain crossings comprises systematically searching through the circuit description to find all the clock domain crossings in the circuit. Optionally, searching for clock domain crossings comprises finding all the clock sources in the circuit, assigning each clocked object to a clock domain of one of the clock sources and finding combinatorial lines which connect two objects that do not belong to the same single clock domain.

Optionally, searching for clock domain crossings comprises finding clock domain crossings having a black-box as a source or sink, having an external port as a source or sink and/or having a black-box as a source or sink. Optionally, classifying the clock domain crossings found in the search comprises classifying at least one clock domain crossing as having an asynchronous reset as a sink. Optionally, classifying the clock domain crossings found in the search comprises classifying at least one clock domain crossing as involving passage of a clock signal between clock domains.

There is further provided in accordance with an embodiment of the present invention, a computer software product, comprising a tangible computer-readable medium in which program instructions are stored, which instructions, when read by a computer, cause the computer to receive a description of a circuit; search through the circuit for clock domain crossings; classify the clock domain crossings found in the search; and assign a score to each of the clock domain crossings.

Optionally, the software is configured to identify clock domain crossings in a plurality of different types of circuits, including ASIC (Application Specific Integrated circuit), FPGA (Field Programmable Gate Array) and CPLD (Complex Programmable Logic Device) circuits.

Optionally, the software is configured to identify all the clock domain crossings within the circuit, without human user tips. Optionally, the software is configured to classify the clock domain crossings and determine their structure, automatically without user tips. Optionally, the software is configured to classify the clock domain crossings by comparing circuit areas around the clock domain crossings to library templates of clock domain crossings. Optionally, the software is configured to classify the clock domain crossings by comparing circuit areas around the clock domain crossings to library templates of incorrect clock domain crossings.

There is further provided in accordance with an embodiment of the present invention a method of analyzing a circuit, comprising receiving, by a processor, a description of a circuit; searching through the circuit for clock domain crossings, automatically by the processor; identifying at least one clock domain crossing as having a circuit object belonging to a plurality of clock domains as a source or a sink; and determining whether the identified at least one clock domain crossing has a synchronizer which is suitable to reduce the probability of circuit malfunctions due to the clock domain crossing. to below a desired threshold level.

Optionally, identifying at least one clock domain crossing comprises identifying a clock domain crossing having a black-box as a sink or source. Optionally, identifying at least one clock domain crossing comprises determining that the black-box has a plurality of different clock signals entering into it.

There is further provided in accordance with an embodiment of the present invention, a method of analyzing a circuit, comprising receiving, by a processor, a description of a circuit; searching through the circuit for clock domain crossings, automatically by the processor; identifying at least one clock domain crossing leading to a non-data entrance of a sequential logic object; and determining whether the identified at least one clock domain crossing has a synchronizer which is suitable to reduce the probability of circuit malfunctions due to the clock domain crossing, to below a desired threshold level.

Optionally, identifying at least one clock domain crossing leading to a non-data entrance of a sequential logic object comprises identifying at least one clock domain crossing leading to an asynchronous reset pin. Optionally, determining whether the identified at least one clock domain crossing has a synchronizer which is suitable to sufficiently prevent circuit malfunctions comprises assigning the identified at least one clock domain crossing a score of a different clock domain crossing in the circuit.

The present invention will be more fully understood from the following detailed description of the embodiments thereof, taken together with the drawings in which:

DETAILED DESCRIPTION OF EMBODIMENTS

Figure 1:
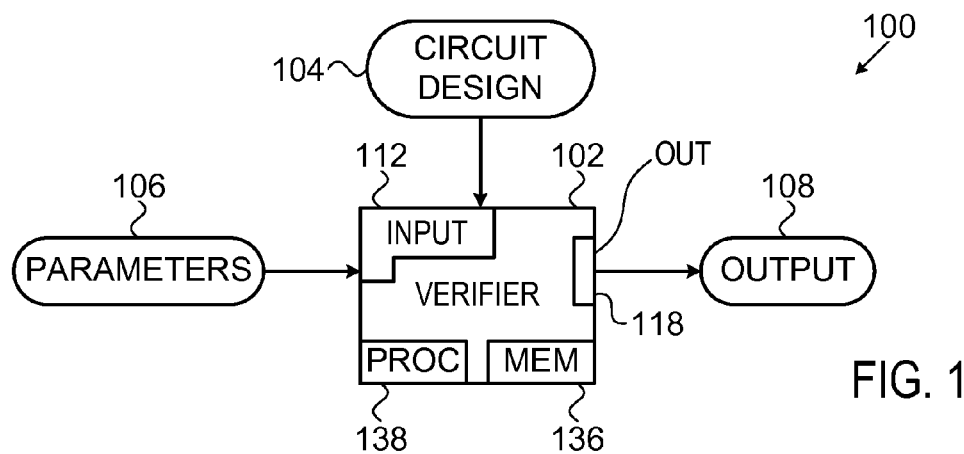
FIG. 1 is a schematic block diagram of a circuit analysis system, in accordance with an embodiment of the invention.

An aspect of some embodiments of the invention relates to an integrated circuit verifier configured to scan an input integrated circuit to identify clock domain crossings, to receive timing information on scanned circuits and to provide based on the received timing information, a score indicative of the reliability of handling clock domain crossings in the integrated circuit. Optionally, the score is a numerical score, for example dependent on the MTBF (mean time between synchronization failures) measure or a similar measure.

In some embodiments of the invention, the received timing information includes indications of the clock rates of clock signals of the integrated circuit. Alternatively or additionally, the received timing information includes the data rate of data received by the circuit.

Optionally, the verifier is configured to determine the structure of a synchronization circuit of the clock domain crossing (e.g., a synchronization depth) and use the determined structure in assigning the score of the clock domain crossing.

An aspect of some embodiments of the invention relates to an integrated circuit verifier configured to identify clock domain crossings including known erroneous circuits. In some embodiments of the invention, the verifier also provides suggestions on how to correct the erroneous circuits. Optionally, the verifier manages a library of known erroneous circuits and compares these known circuits to sub-circuits of verified circuits. In some embodiments, along with each erroneous circuit, the verifier stores a corresponding correct circuit to be used instead and/or instructions on what needs to be corrected. The use of known incorrect circuits allows for simpler provision of correction instructions.

An aspect of some embodiments of the invention relates to an integrated circuit verifier configured to identify clock domain crossings (CDCs) and evaluate their correctness. The verifier is configured to identify objects with multiple clock domains and/or with asynchronous clock domains and to verify their correctness according to the plurality of clock domains.

In some embodiments of the invention, the verifier may operate in a worst case mode in which sub-circuits having an unknown structure (e.g., black boxes) are considered as being included in the clock domains of all the clock signals entering them. While this may add substantially to the complexity of verification results, it allows identification of errors due to black boxes and/or an interface between a black box and other circuit areas, which would not normally be identified.

An aspect of some embodiments of the invention relates to an integrated circuit verifier configured to identify non-data clock domain crossings (CDCs) and to verify that they are properly synchronized. Optionally, the verifier classifies the identified non-data CDCs to identify their type (e.g., asynchronous reset, clock gating, clock switching) and/or provides a score representing the reliability of the CDC synchronization of the non-data CDC. Non-data CDCs are optionally identified as crossings between clock domains in which the sink is not a data or control input of a sequential logic unit, but instead enters, for example, an asynchronous reset input or a clock signal line.

System Overview

FIG. 1 is a schematic block diagram of a VLSI analysis system 100, in accordance with an embodiment of the invention. System 100 comprises a verifier 102 which receives, through an input interface 112, a design 104 of a circuit to be verified. Verifier 102 also receives parameters 106 of the circuit design, such as clock rates, port data rates, operating conditions and target technology attributes, and provides, through an output interface 118, an output 108 indicating the reliability of the received circuit design 104, a suggestion on how to improve the design and/or a corrected circuit.

Design 104 is optionally received as a description in a hardware definition language (HDL) such as Verilog, VHDL, System Verilog, AHDL (Altera Hardware Description Language), iHDL and/or system-C. The description is optionally received in a register transfer level (RTL) or in a netlist or gate level. The integrated circuit may be of substantially any type, including ASIC (Application Specific Integrated circuit), FPGA (Field Programmable Gate Array) and CPLD (Complex Programmable Logic Device).

Verifier 102 typically comprises a general-purpose computer or a cluster of such computers, with suitable interfaces, one or more processors 138, and software for carrying out the functions that are described herein, stored, for example, in a memory 136. The software may be downloaded to the computer in electronic form, over a network, for example. Alternatively or additionally, the software may be held on tangible, non-transitory storage media, such as optical, magnetic, or electronic memory media. Further alternatively or additionally, at least some of the functions of verifier 102 may be performed by dedicated or programmable hardware logic circuits. For the sake of simplicity and clarity, only those elements of verifier 102 that are essential to an understanding of the present invention are shown in the figures.

Figure 2:
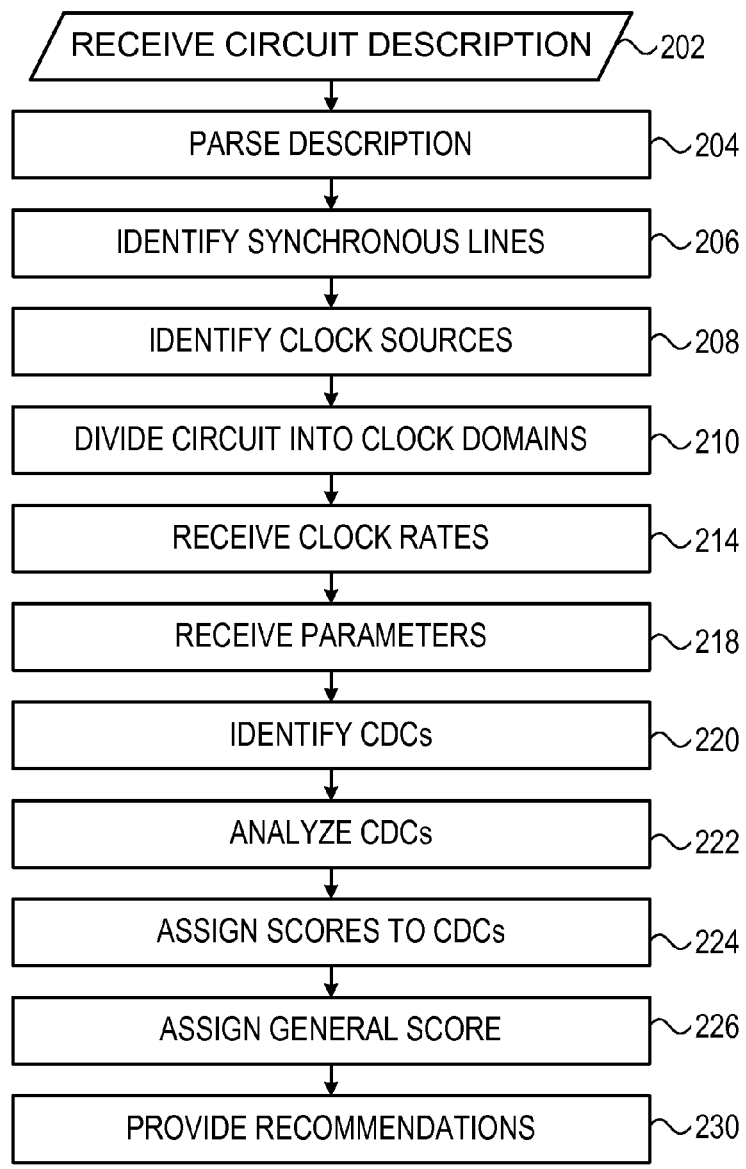
FIG. 2 is a flowchart of acts performed by a circuit verifier, in accordance with one embodiment of the invention.

FIG. 2 is a flowchart of acts performed by verifier 102 in verifying an integrated circuit, in accordance with an embodiment of the invention. Upon receiving (202) a HDL description of an integrated circuit, verifier 102 parses (204) the HDL description into a searchable graph. The parsing may be performed using any suitable method known in the art, such as described in US patent publication 2004/0225974, U.S. Pat. No. 6,169,968 to Kabuo or U.S. Pat. No. 5,870,308 to Dangelo et al., the disclosures of which are incorporated herein by reference in their entirety.

Verifier 102 reviews the parsed HDL and identifies (206) data lines which may carry synchronous data and/or circuit design objects from which these lines come out. The synchronous data lines may be outputs of sequential logic objects, such as registers, flip-flops and latches, or may be external port objects carrying data whose nature cannot be discerned from the parsed HDL. Furthermore, the identified (206) synchronous data lines include lines coming out of synchronous black-boxes, which are circuit objects for which the parsed HDL does not include structure details, but to which at least one clock signal enters. In accordance with some embodiments of the present invention, data lines coming out of black-boxes are assumed to carry synchronous data even if the nature of the data on the line is not known. This is used as a precaution to make sure all possible circuit domain crossings are identified. In some embodiments of the invention, a human user may set an operation mode of verifier 102, for example selecting whether to relate to or to ignore data lines coming out of black-boxes.

Verifier 102 also identifies (208) clock sources, optionally both external and internally generated. The identified synchronous data lines and the sequential data elements are associated with the respective clock source which governs its data rate, thus dividing (210) the circuit into areas according to the clock source that controls the operation of the elements in the area. The area including the elements controlled by a specific clock source is referred to herein as the clock domain of the clock source.

Verifier 102 optionally receives (214) the clock rates of the identified (208) clock sources. In addition, verifier 102 optionally receives (218) general parameters of the integrated circuit, such as the target technology and its operating conditions.

Clock domain crossings (CDCs) are identified (220) by finding data lines belonging to a first clock domain, entering synchronous elements belonging to a different clock domain. The identified clock domain crossings are analyzed (222) to determine their structure and whether the structure is sufficient to prevent errors in the operation of the clock domain crossing.

Each of the clock domain crossings is assigned (224) a score indicative of robustness and a general score is assigned (226) to the entire integrated circuit or to sub-portions thereof. In some embodiments of the invention, verifier 102 additionally provides recommendations (230) which can improve the provided score.

As to identifying (206 data lines which may carry synchronous data, in some embodiments of the invention, the identification is performed on the fly during the parsing (204) of the HDL. Alternatively, the identification (206) is performed in a separate step after the parsing is completed.

As to identifying (208) clock sources, in some embodiments of the invention, the identification includes back traversing from the clock port of each synchronous element until a clock source is found. Optionally, the back propagation is continued along simple connections only until a non-simple connection element or an external port is reached, and the reached object, internal element or external port, is defined as a clock source. In some embodiments, simple connections include only direct lines and combinatorial elements that have a single input and a single output, such as invertors and buffers. In some embodiments of the invention, when the back propagation reaches a non-simple combinatorial logic object, in addition to defining the non-simple combinatorial logic object as a clock source, the back propagation is continued to determine the source of the clock signal entering the non-simple combinatorial logic object. Optionally, verifier 102 also attempts to determine the task of the circuit to which the logic object belongs, in order to determine the relation between the entering clock signal and its output clock signal. For example, verifier 102 is optionally configured with templates of DLLs which divide clock signal frequencies by given values. Upon finding a matching template, the relation between the clock signals is determined. Alternatively or additionally, verifier 102 is configured to identify clock gating logic and identifying clock sources includes adding the clock gating logic and/or back traversing from the clock gating logic.

In some embodiments of the invention, the back-propagating is performed using a method described by the following pseudo-code:

For a vertex A identified as a clock input to a sequential element:

```
if A.ClockType = Generated OR External # clock was already identified
by another search
    return A.ClockType
else
    if (A.PortType = External port)
        A.ClockType = External
        return External
    else
        if (A.Signal = Asynchronous signal, not sequential)
            if (number of edges coming into A=1) # Simple connection
                if (A.HasSimpleInputConnection = FALSE) # e.g. Clk-gate
                    A.Clock = Generated
                    return Generated
                else # There is only a single edge connected and it is trivial
                    Continue to the next vertex of the clock tree
            else # number of edges coming into A > 1
                A.Clock = Generated
                return Generated
        elsif (A.Signal = Sequential logic)
            A.Clock = Generated
            return Generated
        else #BB
            A.ClockType = Generated
            return Generated
```

As to defining (210) clock domains, in some embodiments of the invention, for each identified clock source, verifier 102 traverses the circuit layout forward from the clock source and includes in the domain of the clock source all clock related points reached through simple connections. Optionally, each clock related point is marked with the identity of the clock source leading to it.

In some embodiments of the invention, when an object, such as a black-box, receives a plurality of clock signals, the outputs of the element are associated with all the clock signals in the alternative.

Referring in detail to receiving (214) the clock rates of identified clock sources, optionally verifier 102 queries the user for the clock rate of each of the identified clock sources. Alternatively or additionally, an external constraints file associated with the integrated circuit description, such as a file in an SDC (Synopsis Design Constraints) format, is consulted. The data rate of external ports is optionally also received from the user. The defined clock rates may include precise values or ranges of possible values. Optionally, when a clock source changes over time in accordance with dynamic voltage and frequency scaling (DVFS), the received clock rates include the maximal clock rate or indications of the changes of the clock rates over time. Alternatively or additionally to providing clock rates, a user may optionally provide indications of clock signals which are identical and/or have some rates with different phases, and/or may indicate a relation between clock signals. In some embodiments of the invention, the relationship between clock signals for which user indications were not received is assumed to be asynchronous. Optionally, verifier 102 compares the clock information received from the user, with the information determined from the circuit and provides a warning when there is a mismatch.

The general parameters of the integrated circuit for which values are received (218) optionally include a resolution time constant τ of the circuit and a length of the set-up and hold time required in the circuit, referred to herein as W. The set-up time is the time before the reading of a value that the value should be set in order to make sure the value is read correctly and the hold time is the time after the reading begins during which the value should not be changed.

Optionally, for simplicity, W and τ are assigned global values for the entire integrated circuit. Alternatively, the assigned values of W and τ depend on the internal structures of the flip-flops used, such as their sizes. In some embodiments, in early design stages, when the structures have not been determined yet, a single default value is used for all the flip-flops. Possibly, the default value used is a worst case value. Alternatively, an average value is used for the default. At a later stage, when the specific structures of the flip-flops are known, verifier 102 uses parameter values corresponding to the specific structures.

In some embodiments of the invention, the general parameters are received (218) from a human user. In other embodiments, verifier 102 manages a look up table of parameter values as a function of the type of the circuit (e.g., FPGA (field programmable gate array), PLD (Programmable Logic Device)) and/or the process scale. The parameter values optionally also depend on the operating conditions defined for the circuit, such as temperature and/or voltage.

The values in the look up table are optionally determined in simulations and/or real silicon measurements performed using any suitable method known in the art, such as any of the methods described in S. Beer, R. Dobkin, M. Priel, R. Ginosar, A. Kolodny, "The Devolution of Synchronizers," Proc. of ASYNC, pp. 94-103, 2010, C. Dike and E. Burton, "Miller and noise effects in synchronizing flip-flop" IEEE JSSC, 34(6):849-855, 1999, Peter Alfke, "Metastable Delay in Virtex FPGAs", downloaded from http://forums.xilinx.com/t5/PLD-Blog/Metastable-Delay-in-Virtex-FP-GAs/ba-p/7996,Y. Semiat and R. Ginosar, "Timing Measurements of Synchronization Circuits," ASYNC 2003, S. Beer, R. Dobkin, M. Priel, R. Ginosar, Metastability measurements of several ASIC and FPGA synchronizers, Technical Report, EE department Technion, October 2009, J. Zhou, D. J. Kinnement, G. Russell and A. V. Yakovlev, "On-chip measurement of Deep Metastability in synchronizers", IEEE JSSC, 43(2), 2008, the disclosures of all of which are incorporated herein by reference in their entirety. Alternatively or additionally, one or more of the parameters are extracted from the integrated circuit description using SPICE simulations.

Referring in more detail to identifying (220) clock domain crossings, in some embodiments of the invention the identification includes searching for combinatorial connections which begin in a synchronous circuit object (e.g., sequential logic element, black box, external port) in a first clock domain and end in a sink circuit object in a second clock domain, different from the first.

In some embodiments of the invention, the identification includes reviewing all objects in the circuit which could be sources of a CDC, e.g., sequential logic elements, black boxes and input ports (including input-output ports) and for each possible source object checking its forward combinatorial connections to see if they lead to an object belonging to a different clock domain. Alternatively or additionally, the identification (220) includes reviewing all objects in the circuit which could be sinks of a CDC, e.g., sequential logic elements, black boxes and output ports (including input-output ports) and for each possible sink object checking its backward combinatorial connections to see if they are in a different clock domain.

In some embodiments of the invention, the circuit description is provided in a plurality of layers which include different levels of detail. Optionally, in assigning the objects of the circuit to clock domains, each object of the most detailed layer is assigned a clock domain. Then, the aggregate objects of higher level layers are assigned the clock domains of the objects they include. If all the detailed objects of an upper layer object belong to a single clock domain, the upper layer object is assigned that to that clock domain. If the detailed objects of an upper layer object belong to more than one clock domain, the upper layer object is assigned to the clock domains of all the detailed objects it includes. In searching from clock domain crossings, the search is optionally performed in a hierarchical manner beginning from the highest layer. If a high layer object belongs to a single domain, there is no need to check the connections between objects inside the upper layer object. If, however, an upper layer object is assigned to more than one clock domain, the search is performed in lower layers.

Input external ports that are not assigned to a clock domain are optionally assumed to be asynchronous by default, and any connection of such ports to different objects, even to a different asynchronous port or other object are considered CDCs. Alternatively, input external ports are set by default to the clock domains of all the sequential logic elements they lead to through direct and/or combinatorial connections. Optionally, in accordance with this alternative, the user is cautioned to verify that the assumption is correct. Output external ports are optionally assigned to the clock domain of the signals they carry. Alternatively, output external ports are assumed to be asynchronous by default, such that the user is first to indicate a specific clock domain for the external ports. This alternative may reduce errors due to users depending on defaults without verification. In some embodiments of the invention, the user may set an operation mode of verifier 102, determining what values are to be used as defaults.

Black boxes to which no clock signals enter, are optionally considered to be combinatorial circuits which can be part of a path between two objects. Black boxes to which a single clock signal enters, are optionally assumed to be sequential elements belonging to the clock domain of the clock signal entering the black-box. Black boxes to which a plurality of different clock signals enter, are assumed by default to belong to the clock domains of all the entering clock signals. Optionally, if at least one of the source and sink belong to more than one clock domain, even if both source and sink belong to the same set of clock domains, a clock domain crossing is identified. Alternatively or additionally, other methods of determining the nature of black boxes may be used, such as those described in U.S. provisional patent application 61/511,581, titled: "clock domain Crossing Verifications for Black Boxes", which is assigned to the assignee of the present application and is incorporated herein by reference, in order to limit the number of falsely suspected CDCs detected.

Optionally, the user is provided a chance to indicate for objects, particularly for external ports and black-boxes the clock domain to which they belong, for example by stating that an external port is not asynchronous but rather receives data of a specific clock domain.

Figure 3:
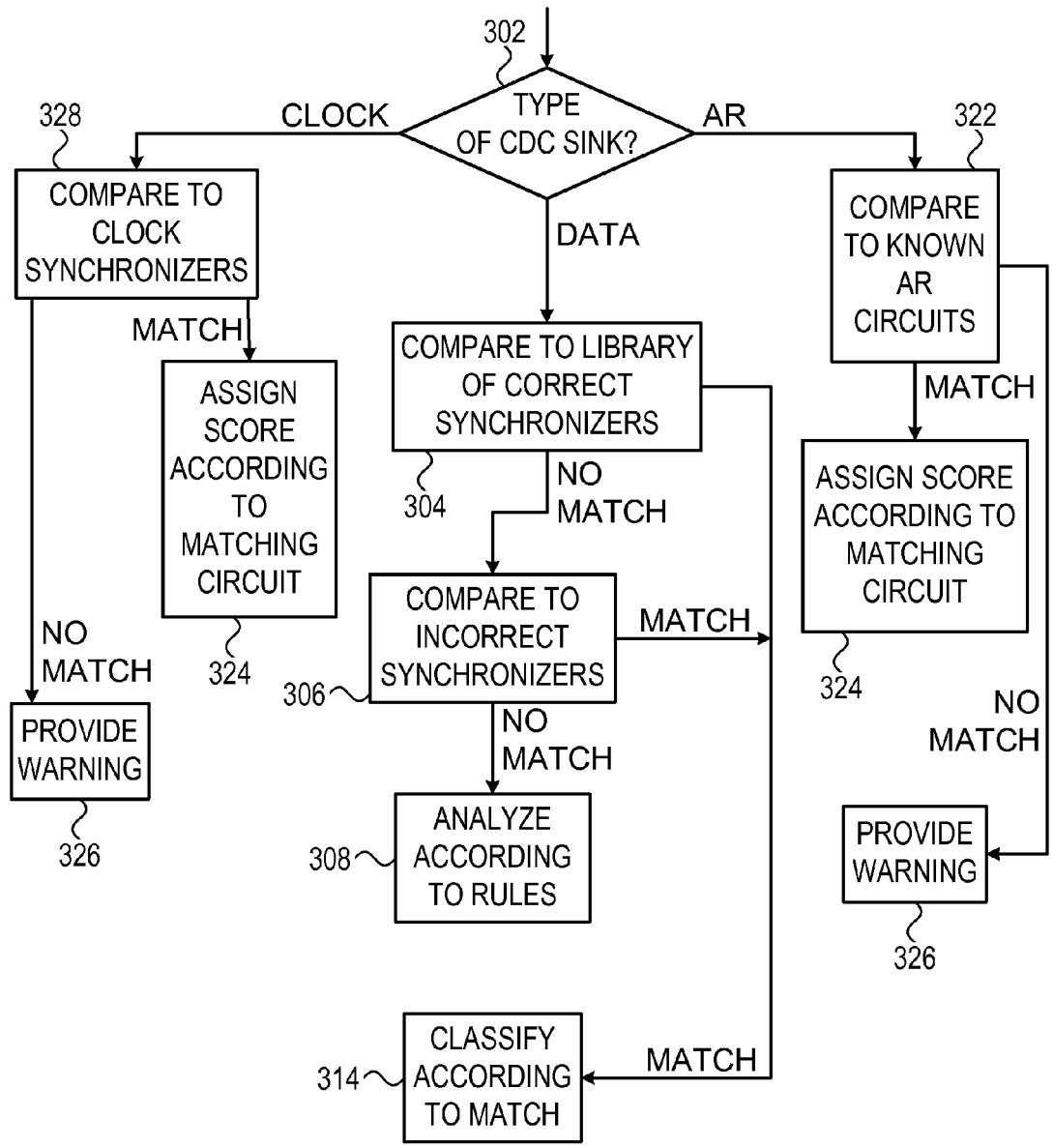
FIG. 3 is a flowchart of acts performed in classifying a clock domain crossing (CDC), in accordance with an embodiment of the invention.

FIG. 3 is a flowchart of acts performed in analyzing a clock domain crossing (CDC), in accordance with an embodiment of the invention. For each identified CDC, verifier 102 determines if (302) the CDC has as a sink which is a data port of a flip-flop (or other sequential logic element, such as a memory unit), the circuit sub-area surrounding the flip-flop is compared (304) to a library of predetermined synchronizer templates known to correctly synchronize clock domain crossings. If (304) a match is found, the CDC is classified (314) as belonging to the type of the matching library template and its further analysis is optionally performed using corresponding parameters from the library.

If (304) a corresponding correct synchronizer template is not found, the circuit sub-area surrounding the flip-flop is compared (306) to a library of predetermined templates of known incorrect synchronizers. The library of incorrect CDC synchronizers optionally includes examples of CDCs which are missing synchronizers, include greedy paths and/or have parallel synchronizers. The library of incorrect synchronizers optionally includes those described in Ran Ginosar, "Fourteen Ways to Fool Your Synchronizer", proceedings of the ninth international symposium on asynchronous circuits and systems, 2003, the disclosure of which is incorporated herein by reference. Other and/or additional incorrect synchronizer templates may be included in the library. If (306) a matching incorrect template is found, the CDC is classified (314) accordingly. Otherwise, the CDC is optionally analyzed (308) according to rules for evaluating synchronizers and for determining their parameters, such as those described in above mentioned US patent application publication 2006/0190754.

The comparison of the circuit sub-area to the library templates is optionally performed using known template equivalence checking methods and/or formal verification methods, such as N-flop synchronizer identification, gray code identification, handshake identification and/or re-convergence path checking. The circuit sub-area surrounding the flip-flop included in the comparison is optionally the circuit area forward from the flip-flop in the signal propagation direction. Alternatively, the comparison may include also circuit branches parallel to the flip-flop and/or other surrounding elements. In some embodiments, the surrounding circuit area included with the flip-flop in the search may include one or more adjacent CDCs. The extent of the circuit included in the comparison is optionally determined based on the extent of the library templates to which the circuit is compared.

If the CDC sink is a black-box port or an external port, verifier 102 optionally assigns a default class to the CDC, absent information from the user. Optionally, the default is a simple flip-flop without a synchronization circuit. This default solution will result in providing warnings to the user for each such CDC. Alternatively, when more appropriate, verifier 102 uses other default classes.

Figure 4:
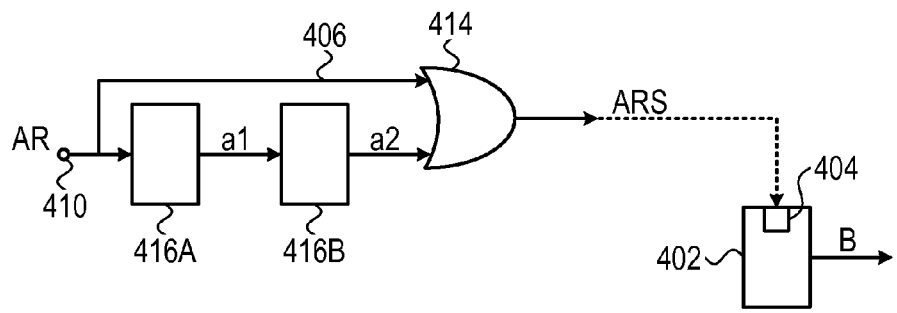
FIGS. 4-6 are schematic block diagrams of clock domain crossing templates stored in a library of a circuit verifier, in accordance with an embodiment of the invention.

If (302) the data line of the CDC passing between clock domains enters an asynchronous reset port of a sequential logic element, verifier 102 optionally compares (322) the sub-circuit surrounding the CDC to one or more known synchronizers of asynchronous resets, such as shown in FIG. 4, to verify that proper synchronization is used. If an appropriate synchronizer is found, the asynchronous reset CDC is assigned (324) the score of the synchronizer. Otherwise, a warning (326) is generated on the unsynchronized asynchronous reset. It is noted that the term asynchronous reset is used in the present application and claims broadly to include also asynchronous sets.

FIG. 4 is a schematic diagram of a asynchronous reset synchronization circuit template, in accordance with an exemplary embodiment of the invention. When a asynchronous reset (AR) signal is to be provided from an external port 410 to an asynchronous reset pin 404 of a flip-flop 402, a line 406 connecting external port 410 to asynchronous reset port 404 is passed through an OR gate 414 in parallel to a sequence of at least two flip-flops 416 (marked 416A and 416B) times by the clock of flip-flop 402. When an asynchronous reset is released, the sequence of flip-flops 416 prevents the release from taking effect until it is properly timed with flip flop 402, in a manner which prevents malfunctioning of the circuit.

When a circuit of the type shown in FIG. 4 is examined by verifier 102, two CDCs are found. The line from port 410 to the first flip flop 416A is determined to be a first CDC because port 410 is asynchronous and flip-flop 416A is therefore by definition in a different clock domain. Verifier 102 compares the circuit beginning with the first flip flop 416A to known synchronization templates to make sure it is planned correctly and assigns the synchronizer formed of flip-flops 416 a score, as discussed in detail below. A second CDC is found in line 406 leading from port 410 through OR gate 414 to asynchronous reset pin 404. Verifier 102 determines that the CDC is of an asynchronous reset type and compares the circuit surrounding line 406 to the corresponding template for asynchronous reset CDCs. If a match is found, the second CDC is assigned the score of the first CDC.

Figure 5:
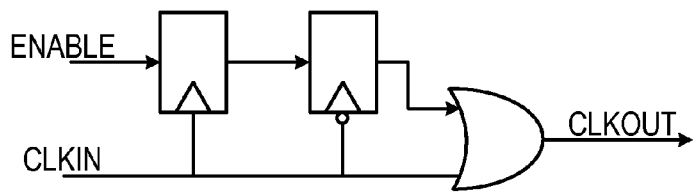
Figure 6:
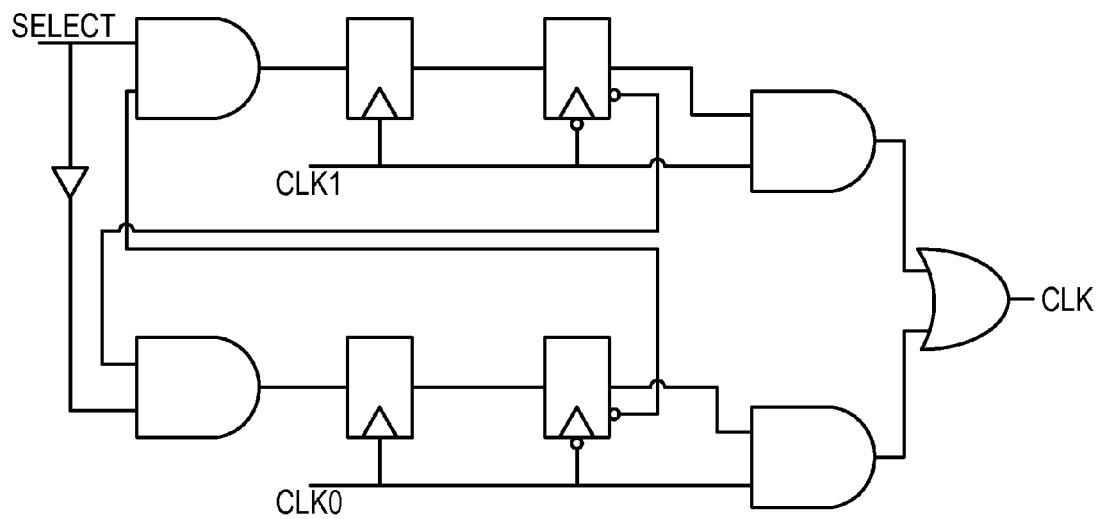

Referring back to FIG. 3, if (302) the data line of the CDC passing between clock domains is a clock signal passing to a different clock signal, a clock gating or switching CDC is identified. The circuit sub-area around the identified CDC is compared (328) to suitable library synchronizer circuit templates for clock signal CDCs, such as those shown in FIGS. 5-6 for example, and if a match is found, the CDC is assigned (324) the score of its corresponding synchronizer in a manner similar to that discussed above regarding AR CDCs. Otherwise, a warning is generated (326) for the clock CDC. It is noted that if the user defines the clock signals of the source and destination as being the same, verifier 102 will not define a clock CDC.

The assigning (224) of a score to clock domain crossings optionally includes calculating a mean time between synchronization failures (MTBF) for example using:

$$MTBF = \frac{e^{S/\tau}}{W \cdot F_C \cdot F_D}$$

As discussed above, W and $\tau$ are parameters of circuit production process.

S is the settling time (S) of a synchronizer of the clock domain crossing. Optionally, the library of known correctly synchronized clock domain crossings managed by verifier 102 also indicates the value of S for each synchronizer and/or provides a formula for calculating the settling time based on values of technology parameters, such as Skew and phase shift, of the specific production process of the integrated circuit being used. Alternatively or additionally, verifier 102 determines the settling time S according to the structure of the synchronizer, optionally by determining the worst path (e.g., the path that takes the most time to propagate) between the first and second flip-flops of the synchronizer and estimating a propagation time for each element of the path. If more than two flip-flops are cascaded, settling times for these flip-flops are also added, making S larger. The determination of the settling time may be performed using any of the methods described in S. Beer, R. Dobkin, M. Priel, R. Ginosar, A. Kolodny, "The Devolution of Synchronizers," Proc. of ASYNC, pp. 94-103, 2010, for example.

In some embodiments of the invention, verifier 102 determines for each synchronizer the number of chained flip-flops in the synchronizer and accordingly determines the settling time. Verifier 102 optionally also determines for the settling time determination, the timing of the flip-flops, for example whether they are triggered on rising or falling edges.

Optionally, in cases in which verifier 102 does not have information about the sink flip-flop (or other sequential logic element), for example when the sink is a black box or an external port, a default average or worst case value is assumed, until the user provides more accurate information.

The value of $F_c$ is optionally set as the clock rate of the sink of the CDC. $F_d$ is optionally set by default to the frequency of the clock of the source of the CDC, which is the highest rate at which the source can provide data. Optionally, verifier 102 queries the user and/or otherwise receives user input on the data rate provided, and if the user provides a lower data rate, that rate is used for $F_d$. In some embodiments, $F_d$ is also a function of the type of synchronizer used, and if the synchronizer is known to require more than one cycle to transfer data signals through the synchronizer the data rate is set to the source clock rate divided by the number of cycles required by the synchronizer to transfer data. The data rate of transferring data signals through the synchronizer is referred to as its latency.

Optionally, when a FIFO synchronizer is used, $F_d$ is calculated as the minimum between the source clock and the sink clock. In some embodiments of the invention, $F_d$ is calculated using any of the methods described in R. Dobkin, R. Ginosar, "Fast Universal Synchronizers," PATMOS, pp. 199-208, 2008, the disclosure of which is incorporated herein by reference.

In some embodiments of the invention, after identifying (220) the CDCs, verifier 102 searches for groups of CDCs which can be analyzed together due to their similarity. Optionally, when a plurality of CDCs are defined from a single source, leading to a plurality of similar circuit units, such as a parallel entrances of a memory unit along a bus, verifier notes the similarity and sets a single score for all the CDCs, by analyzing only one or possibly two of the CDCs. Similarly, when a single sink is connected through a plurality of CDCs to similar sources, verifier 102 optionally performs a single analysis for all the CDCs. In some embodiments, also when a plurality of identical high levels units having the same structure are identified, their analysis is performed only once. It is noted that analysis of a plurality of sub-area circuits together may be used also in earlier and/or later stages, such as in identifying the CDCs. The identification of similar CDCs may be performed, for example, using the methods described in U.S. provisional patent application 61/427,182, titled: "Clock Domain Crossing Auto-constraining and Bundling", filed Dec. 26, 2010, which is assigned to the assignee of the present application and is incorporated herein by reference in its entirety.

As to assigning (226) a general score to the entire integrated circuit, optionally the general score is calculated according to the MTBF values of the clock domain crossings (CDCs) identified in the circuit. For example, the general score may be calculated as the minimum of the MTBFs of the CDCs of the circuit, divided by the number of CDCs in the integrated circuit. Alternatively, the general score is calculated more accurately as the reciprocal (1/X) of the sum of the reciprocals of the MTBFs of the specific CDCs. Further alternatively or additionally, a weighted sum of the scores of the different CDCs is used, optionally setting the weights according to the clock rates of the clocks of the CDC, giving less weight to CDCs having lower clock rates.

As to providing the recommendations (230), in some embodiments of the invention, verifier 102 optionally points out the CDCs having the lowest MTBF scores. For each CDC having a low MTBF, verifier 102 optionally determines the MTBF achieved by one or more possible changes to the existing synchronizer, for example by adding an additional flip-flop. Optionally, in addition to determining the MTBF, verifier 102 estimates the extra cost associated with the changes to the existing synchronizer and any side effects to the operation of the circuit, such as a slow down in the operation of the synchronizer.

In some embodiments of the invention, verifier 102 additionally determines the MTBF for using at least one different synchronizer, which matches to the same sink clock and has the same or shorter synchronizer latency. Verifier 102 may routinely consider synchronizer replacement, or may consider synchronizer replacement only if changing the current incorrect synchronizer does not achieve sufficient results. The considered different synchronizers are optionally ones that are suitable for the target technology, clock rates and interfaces.

In determining whether a suggested corrected or different synchronizer is suitable, verifier 102 may be configured with weights to give to the MTBF, the layout cost and the synchronizer latency. For example, the user may configure verifier 102 to give a high importance to achieving a high MTBF, even if requiring additional resources. On the other hand, the user may configure verifier 102 not to consider synchronizers requiring more than a predetermined extent of resources or to consider them only if the MTBF achieved otherwise is lower than a provided low threshold. Optionally, the goal MTBF of the replacement synchronizer is selected as a function of the MTBFs of other CDCs of the integrated circuit, for example setting a goal as the median of the MTBFs of the CDCs of the circuit.

Optionally, if the considered synchronizers do not provide sufficient results, verifier 102 may suggest a synchronizer with a longer latency.

Optionally, verifier 102 determines whether the CDC connects clock domains governed by two clocks which are related to each other, for example being mesochronous. In such cases, verifier 102 optionally suggests not using a regular synchronizer but rather using other methods known in the art to control the CDC.

The recommendations may be provided to the user who is required to generate corrected circuits. Alternatively, in a semi-automatic process, verifier 102 or a circuit builder connected thereto, either on a same processor or on a different processor, generates a corrected circuit patch based on the recommendations. The user then can take the generated corrected circuit patch and insert it into the integrated circuit instead of the erroneous circuit portion. In other embodiments, the process of generating the correction circuit patch and inserting it into the integrated circuit is completely automatic, at most requiring a few user acknowledgements.

Verifier 102 may be used at one or more points during the design of a circuit. It may be used after the RTL design, after RTL verification and synthesis and/or after place and route design. In some embodiments of the invention, verifier 102 is applied to a designed integrated circuit by a human user at one or more stages during the design of the circuit. Alternatively, verifier 102 may operate in the background of a circuit design software and operate automatically, periodically or when substantial changes are make to a design. Optionally, after verifier 102 provides recommendations, verifier 102 monitors the changes made to the design until the circuit is determined to be error-free.

CONCLUSION

The assignment of a score to CDCs in accordance with embodiments of the present invention may be performed for CDCs identified using various methods, including template comparison and/or rule based identification, and is not limited to CDCs identified with a specific method.

It will be appreciated that the above described methods and apparatus are to be interpreted as including apparatus for carrying out the methods and methods of using the apparatus.

It should be understood that features and/or steps described with respect to one embodiment may sometimes be used with other embodiments and that not all embodiments of the invention have all of the features and/or steps shown in a particular figure or described with respect to one of the specific embodiments. Tasks are not necessarily performed in the exact order described.

It is noted that some of the above described embodiments may include structure, acts or details of structures and acts that may not be essential to the invention and which are described as examples. Structure and acts described herein are replaceable by equivalents which perform the same function, even if the structure or acts are different, as known in the art. The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A circuit verifier, comprising:
an input interface configured to receive descriptions of integrated circuits; and
a processing unit configured to scan through a description of an integrated circuit received through the input interface in order to identify clock domain crossings in the circuit, to classify the identified clock domain crossings and to provide a numerical reliability score for each of the identified clock domain crossings, responsively to the classifications of the identified clock domain crossings, the reliability score representing a reliability of the identified clock domain crossing,
wherein the classifying includes searching for groups of clock domain crossings and assigning each group a single score according to a structure of a circuit area around the clock domain crossings of the group.

2. The verifier of claim 1, wherein the processing unit is configured to calculate for each clock domain crossing, a mean time between synchronization failures (MTBF), based on one or more attributes of the clock domain crossing.

3. The verifier of claim 1, wherein the descriptions of integrated circuits comprise descriptions in a hardware definition language.

4. The verifier of claim 1, wherein the processing unit is configured to provide numerical scores for integrated circuits of different types, including ASIC (Application Specific Integrated circuit), FPGA (Field Programmable Gate Array) and CPLD (Complex Programmable Logic Device), and wherein the score is a function of the circuit type.

5. The verifier of claim 1, wherein the processing unit is configured to calculate a general reliability score for an integrated circuit based on the scores of the clock domain crossings of the integrated circuit.

6. The verifier of claim 1, wherein the processing unit is configured to receive timing information from a user through the input interface and to determine the scores responsive to the received timing information.

7. The verifier of claim 6, wherein the received timing information comprises rates of the clock signals of the circuit.

8. The verifier of claim 1, wherein in identifying clock domain crossings, the processing unit is configured to identify and provide a score for clock domain crossings having a black-box as a source or sink.

9. The verifier of claim 1, wherein in identifying clock domain crossings, the processing unit is configured to identify and provide a score for clock domain crossings having an external port as a source or sink.

10. The verifier of claim 1, wherein in identifying clock domain crossings, the processing unit is configured to identify and provide a score for clock domain crossings having a sink in an asynchronous reset pin of a sequential logic element.

11. The verifier of claim 1, wherein in identifying clock domain crossings, the processing unit is configured to identify and provide a score for clock domain crossings involving a clock signal moving from a first clock domain to a second clock domain.

12. The verifier of claim 1, wherein the processing unit is configured to assign a single object of the integrated circuit to a plurality of clock domains concurrently, when appropriate.

13. The verifier of claim 1, wherein the reliability score represents a chance of a failure in the identified clock domain crossing.

14. A circuit verifier comprising:
an input interface configured to receive descriptions of integrated circuits; and
a processing unit configured to scan through a description of an integrated circuit received through the input interface in order to identify clock domain crossings in the circuit, to compare the identified clock domain crossings to a library of clock domain crossing templates and to provide a numerical score for each of the identified clock domain crossings, using results of the comparison.

15. The verifier of claim 14, wherein the processing unit is configured to compare at least some of the identified clock domain crossings to a library of erroneous clock domain crossing templates.

16. The verifier of claim 14, wherein the processing unit is configured to compare the identified clock domain crossings to a library of clock domain crossing templates including corresponding timing information and to provide a numerical score for each of the identified clock domain crossings, wherein the score is determined using the corresponding time information of a matching template.

17. A method of analyzing a circuit, comprising:
receiving, by a processor, a description of a circuit;
searching through the circuit for clock domain crossings, automatically by the processor;
classifying the clock domain crossings found in the search, wherein the classifying includes searching for groups of clock domain crossings and assigning each group a single score according to a structure of a circuit area around the clock domain crossings of the group; and
assigning a reliability score to each of the clock domain crossings found in the search, responsively to the classifications of the clock domain crossings.

18. The method of claim 17, wherein searching for clock domain crossings comprises systematically searching through the circuit description to find all the clock domain crossings in the circuit.

19. The method of claim 17, wherein searching for clock domain crossings comprises finding all the clock sources in the circuit, assigning each clocked object to a clock domain of one of the clock sources and finding combinatorial lines which connect two objects that do not belong to the same single clock domain.

20. The method of claim 19, wherein searching for clock domain crossings comprises finding clock domain crossings having a black-box as a source or sink.

21. The method of claim 19, wherein searching for clock domain crossings comprises finding clock domain crossings having an external port as a source or sink.

22. The method of claim 17, wherein searching for clock domain crossings comprises finding clock domain crossings having a black-box as a source or sink.

23. The method of claim 17, wherein classifying the clock domain crossings found in the search comprises classifying at least one clock domain crossing as having an asynchronous reset as a sink.

24. The method of claim 17, wherein classifying the clock domain crossings found in the search comprises classifying at least one clock domain crossing as involving passage of a clock signal between clock domains.

25. The method of claim 17, wherein classifying the clock domain crossings found in the search comprises comparing circuit areas around the clock domain crossings to library templates of clock domain crossings.

26. The method of claim 17, wherein classifying the clock domain crossings comprises comparing circuit areas around the clock domain crossings to library templates of incorrect clock domain crossings.

27. The method of claim 17, wherein classifying the clock domain crossings found in the search comprises identifying non-data clock domain crossings.

28. The method of claim 17, wherein classifying the clock domain crossings found in the search comprises identifying data lines with clock domain crossings.

29. A computer software product, comprising a tangible computer-readable medium in which program instructions are stored, which instructions, when read by a computer, cause the computer to:
receive a description of a circuit;
search through the circuit for clock domain crossings;
classify the clock domain crossings found in the search, wherein the classifying includes searching for groups of clock domain crossings and assigning each group a single score according to a structure of a circuit area around the clock domain crossings of the group; and
assign a reliability score to each of the clock domain crossings found in the search, responsively to the classifications of the clock domain crossings.

30. The computer software of claim 29, wherein the software is configured to identify clock domain crossings in a plurality of different types of circuits, including ASIC (Application Specific Integrated circuit), FPGA (Field Programmable Gate Array) and CPLD (Complex Programmable Logic Device) circuits.

31. The computer software of claim 29, wherein the software is configured to identify all the clock domain crossings within the circuit, without human user tips.

32. The computer software of claim 29, wherein the software is configured to classify the clock domain crossings and determine their structure, automatically without user tips.

33. A computer software product, comprising a tangible computer-readable medium in which program instructions are stored, which instructions, when read by a computer, cause the computer to:
receive a description of a circuit;
search through the circuit for clock domain crossings;
classify the clock domain crossings found in the search by comparing circuit areas around the clock domain crossings to library templates of clock domain crossings; and
assign a score to each of the clock domain crossings.

34. The computer software of claim 33, wherein the software is configured to classify the clock domain crossings by comparing circuit areas around the clock domain crossings to library templates of incorrect clock domain crossings.

* * * * *